Aug. 30, 1927.
H. A. FINK ET AL
1,640,762
MACHINE FOR CLOSING FILLED CANS
Filed Oct. 17, 1925
9 Sheets-Sheet 6
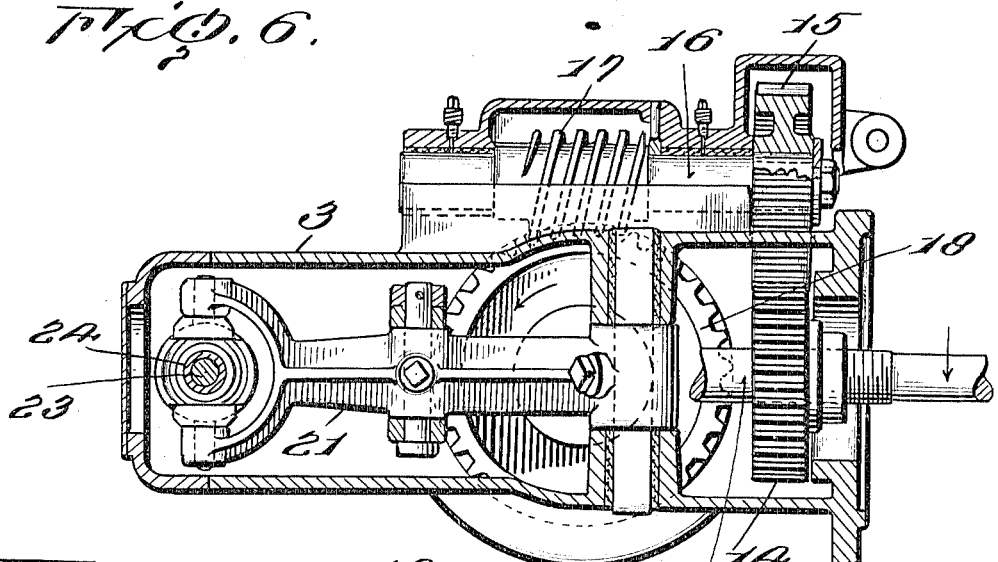
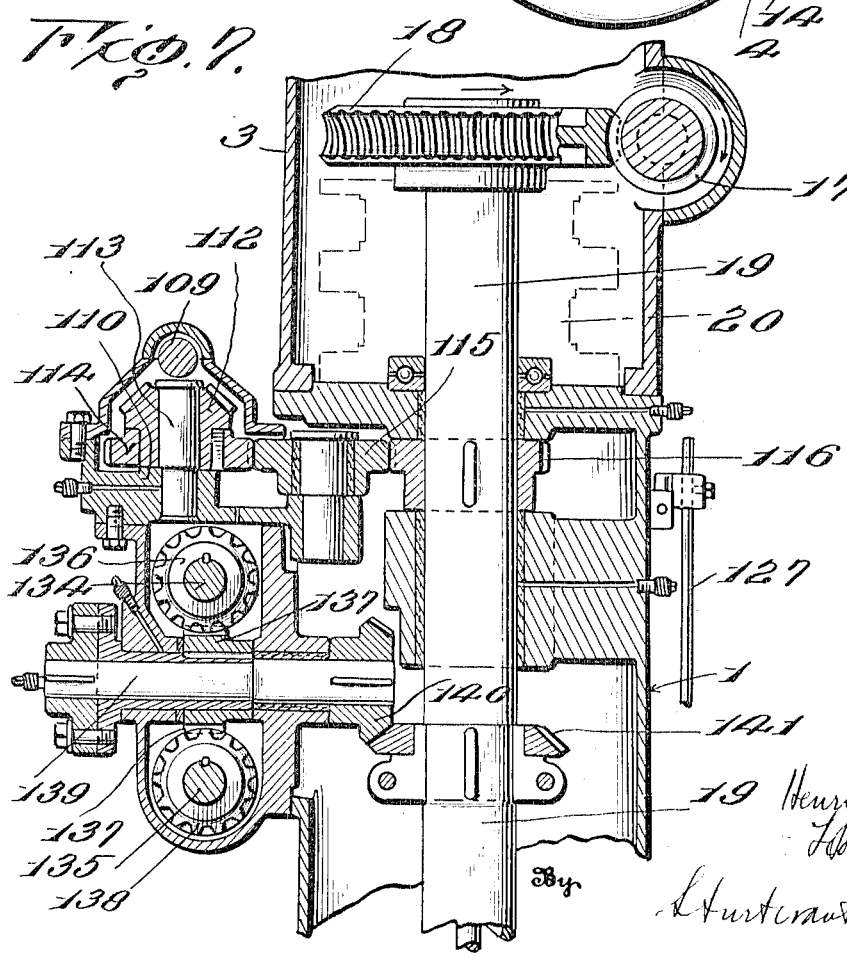

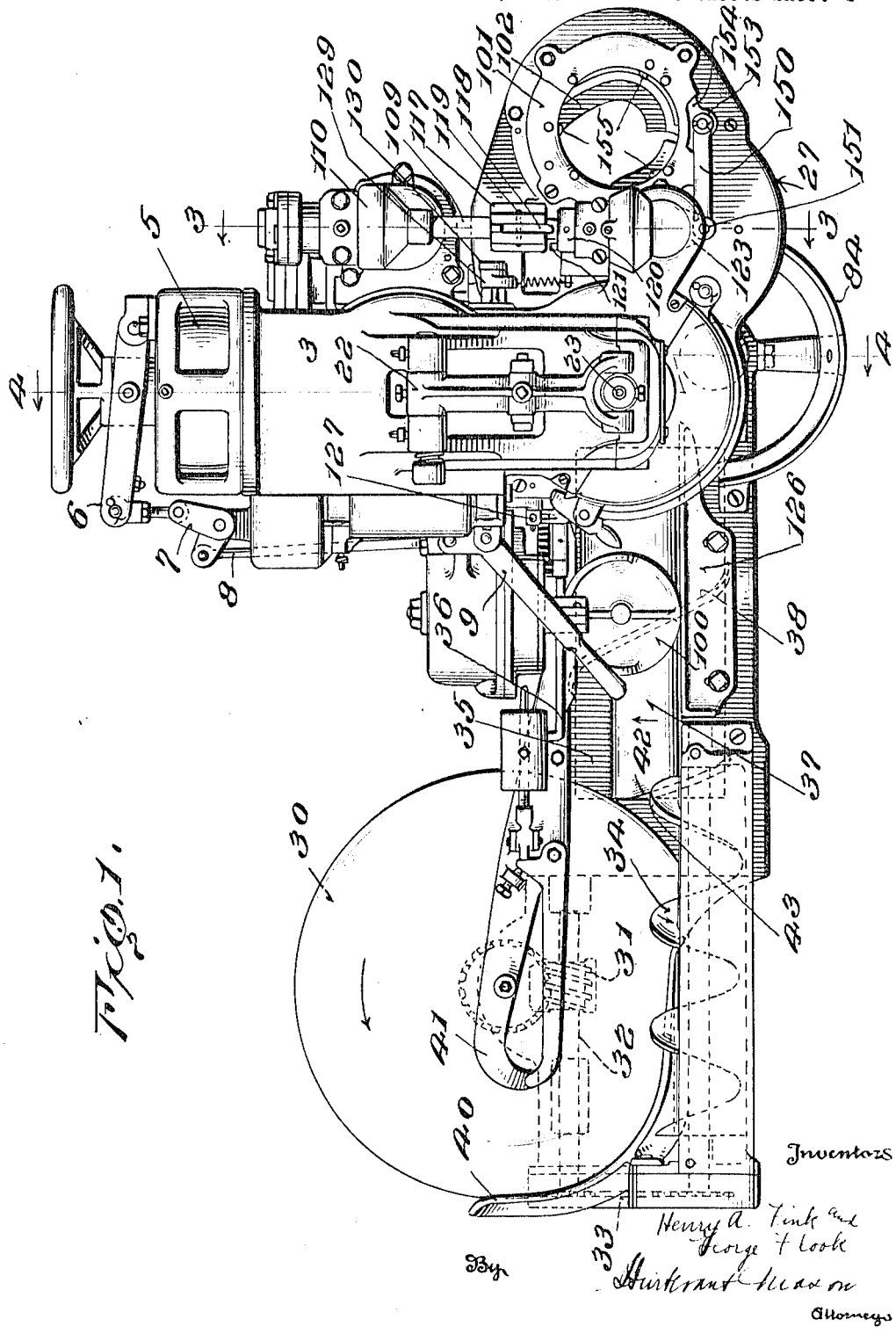

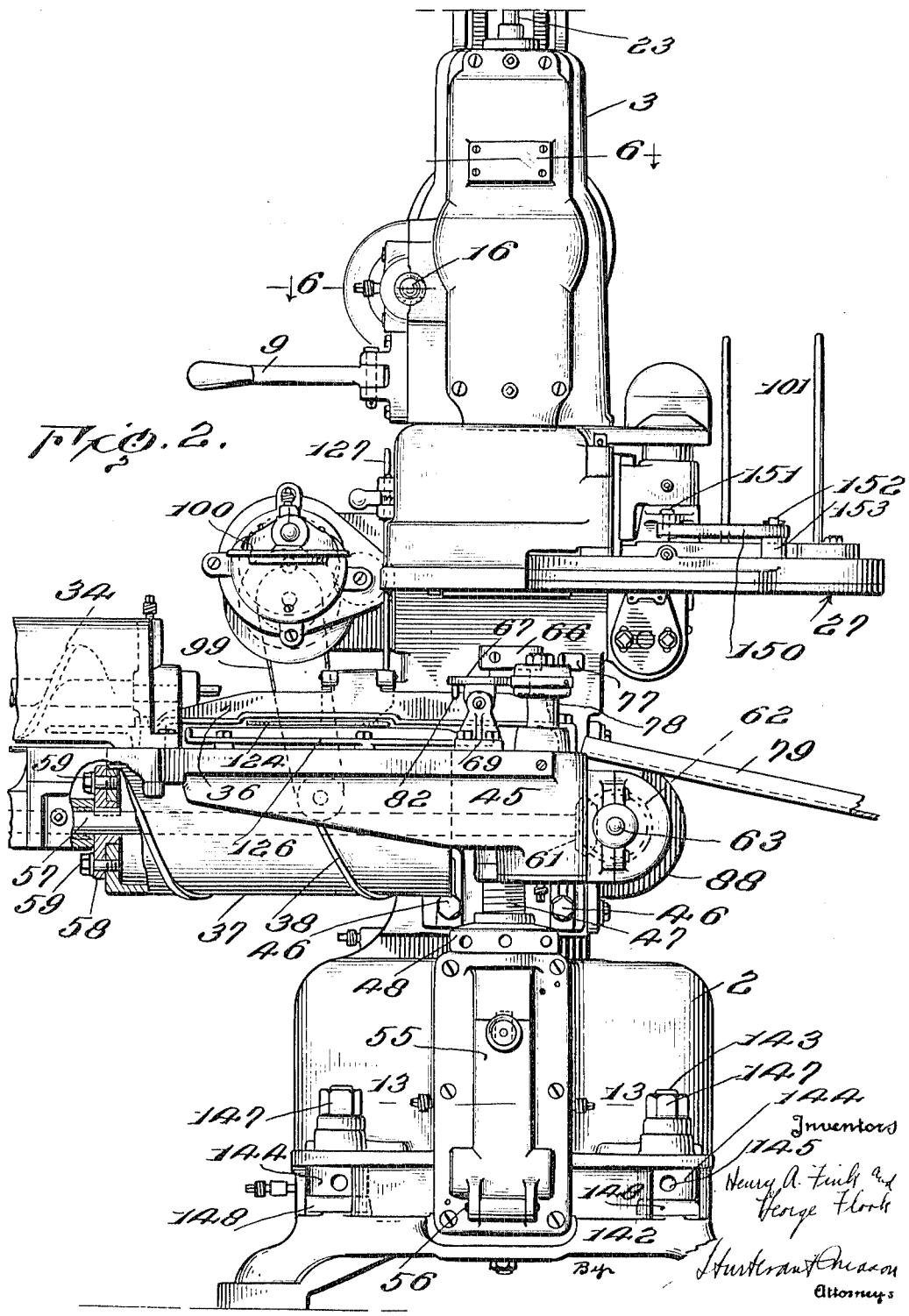

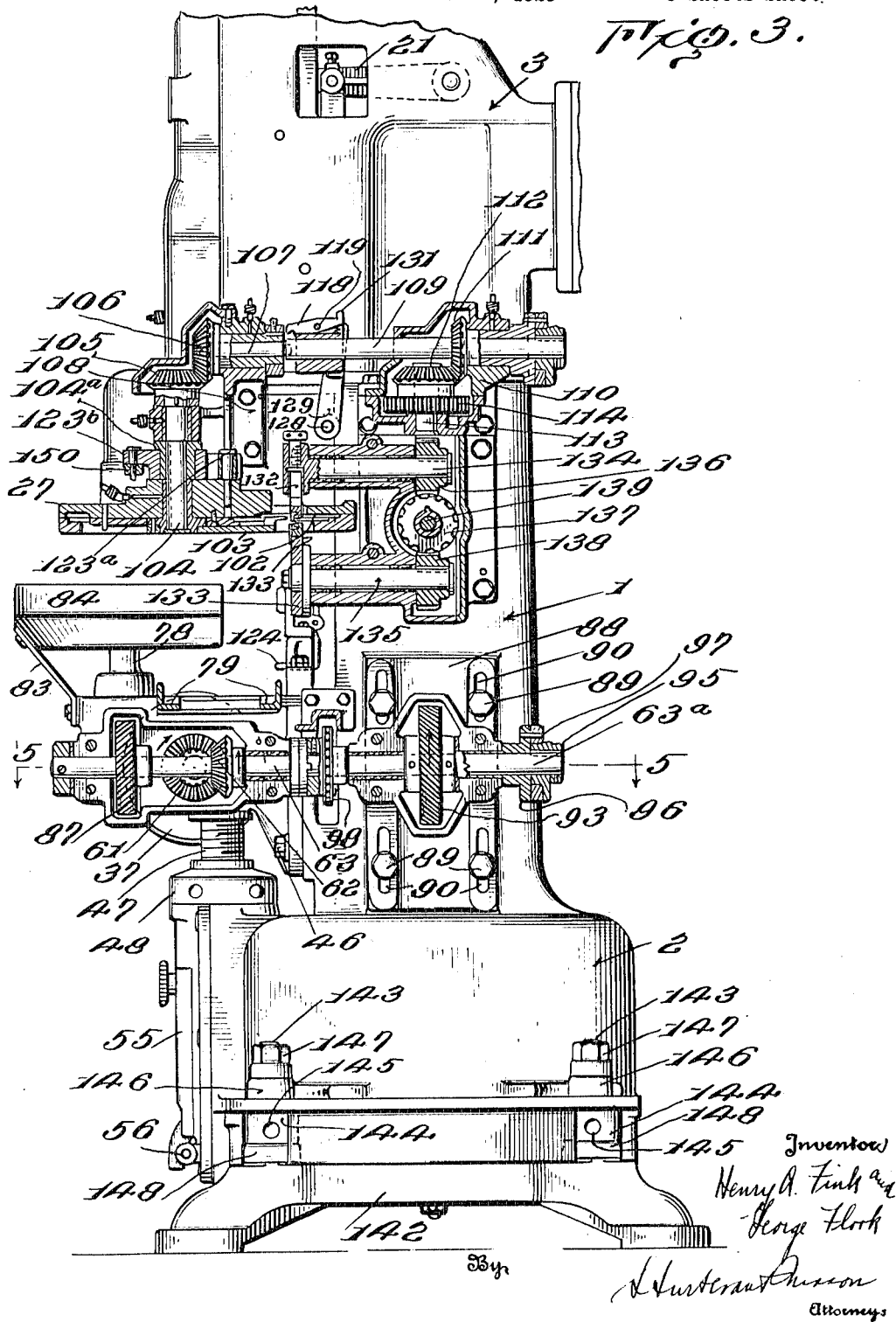

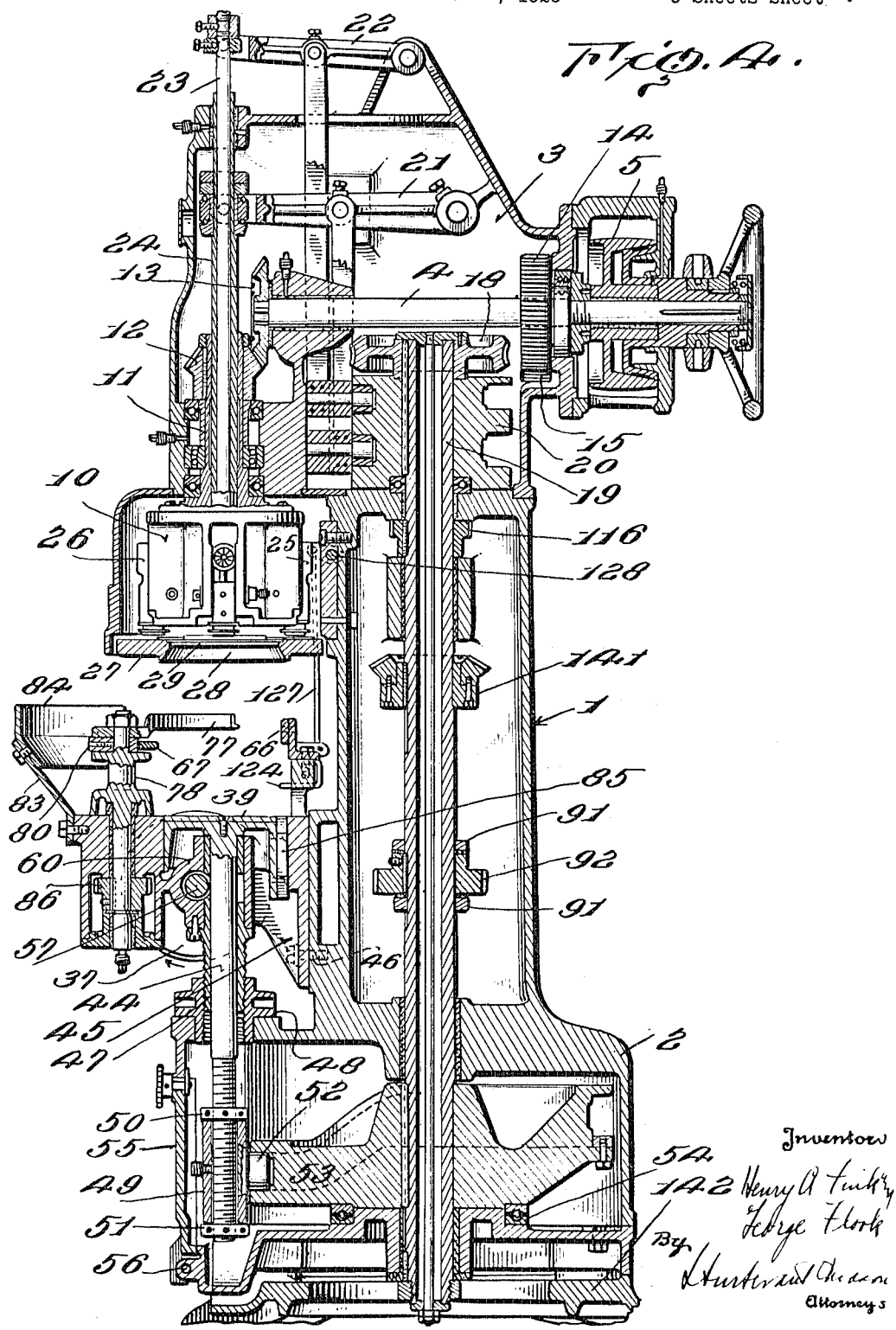

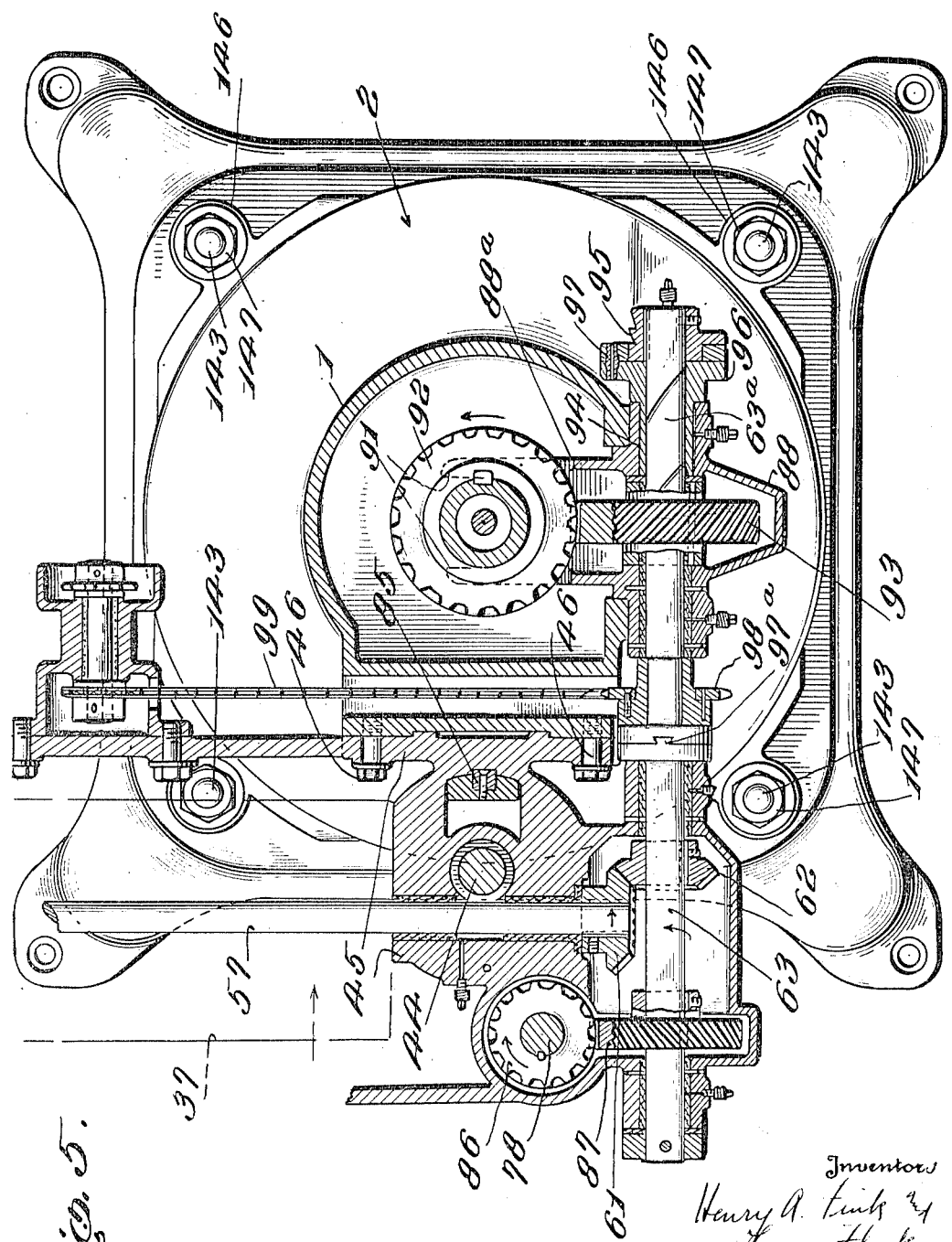

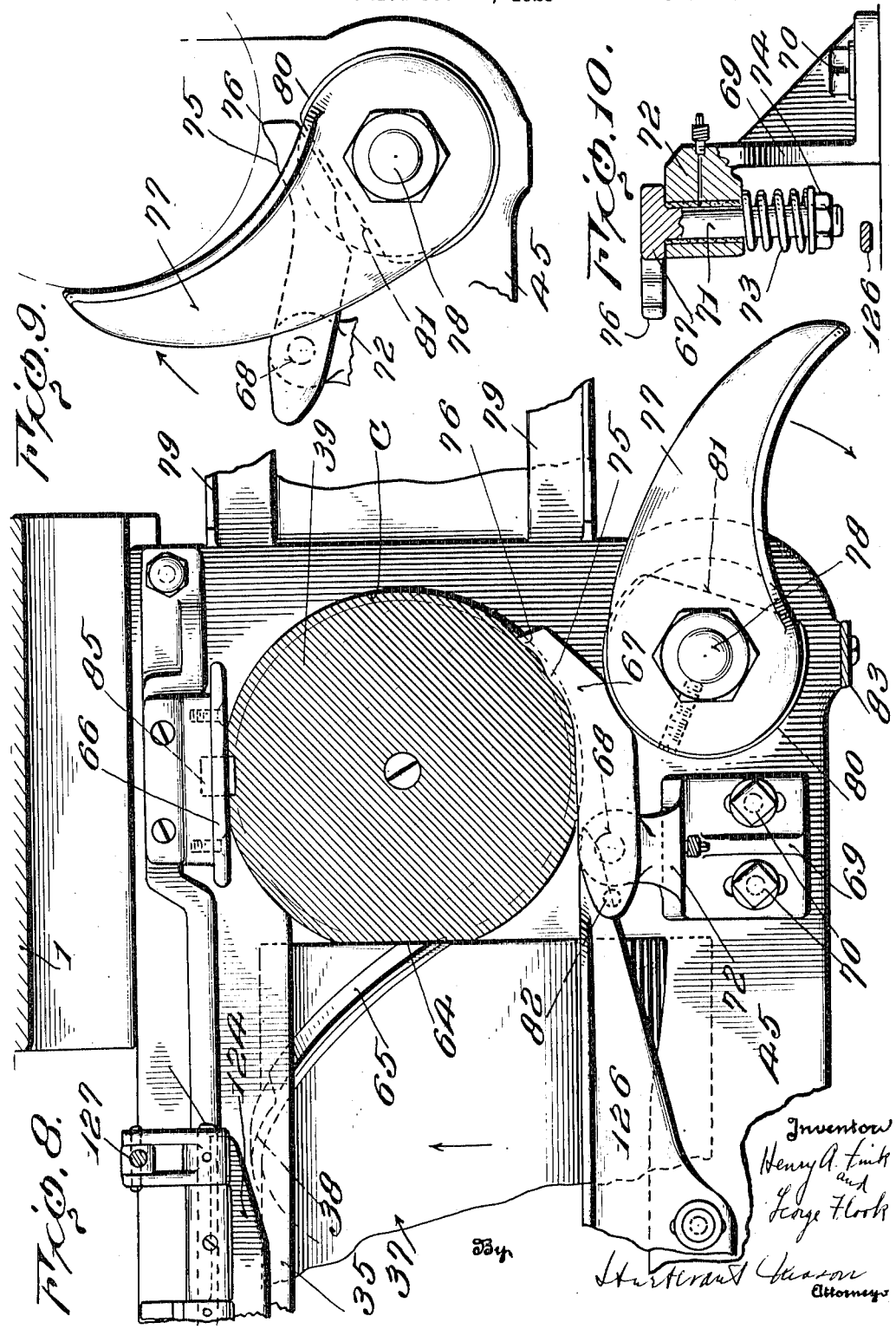

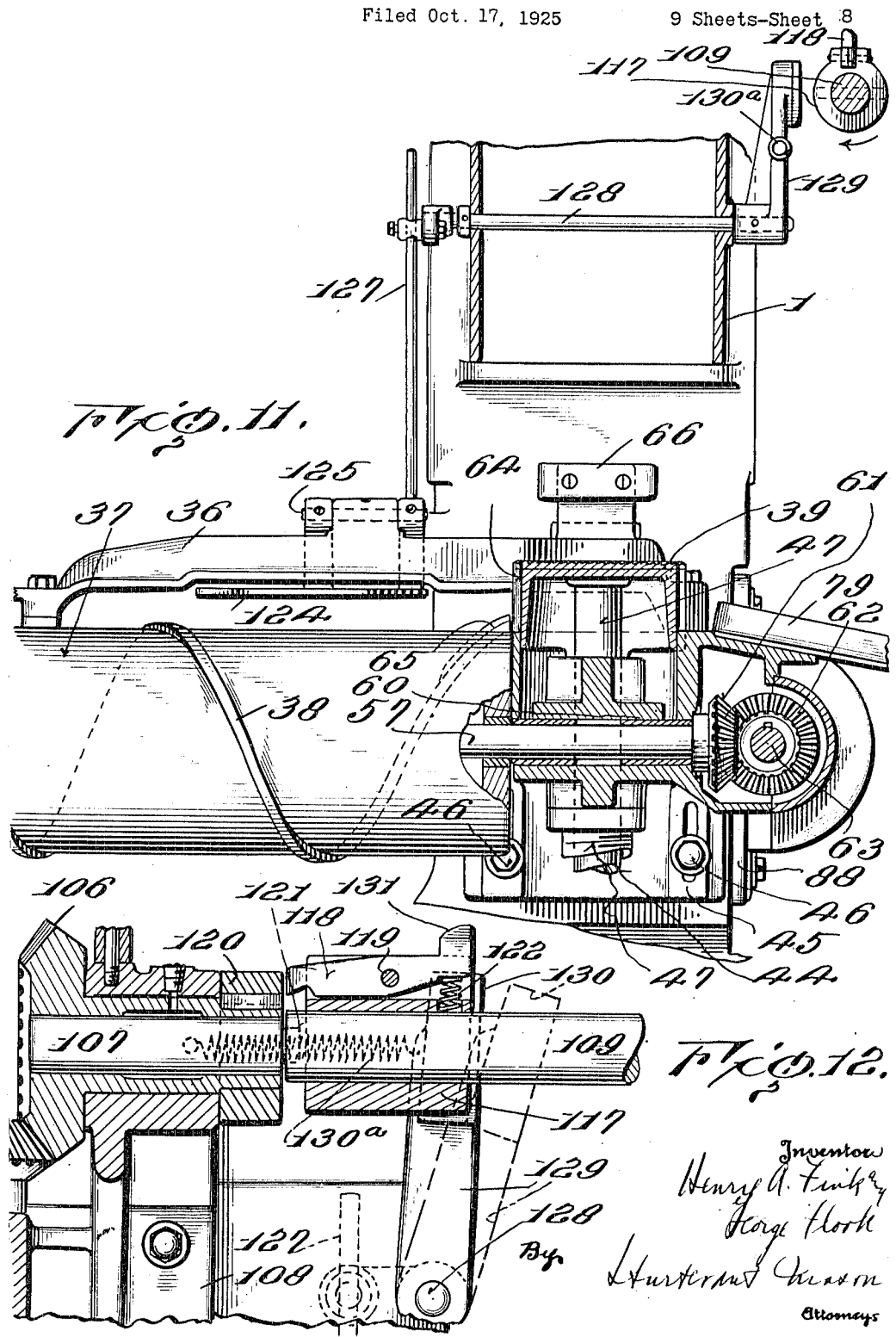

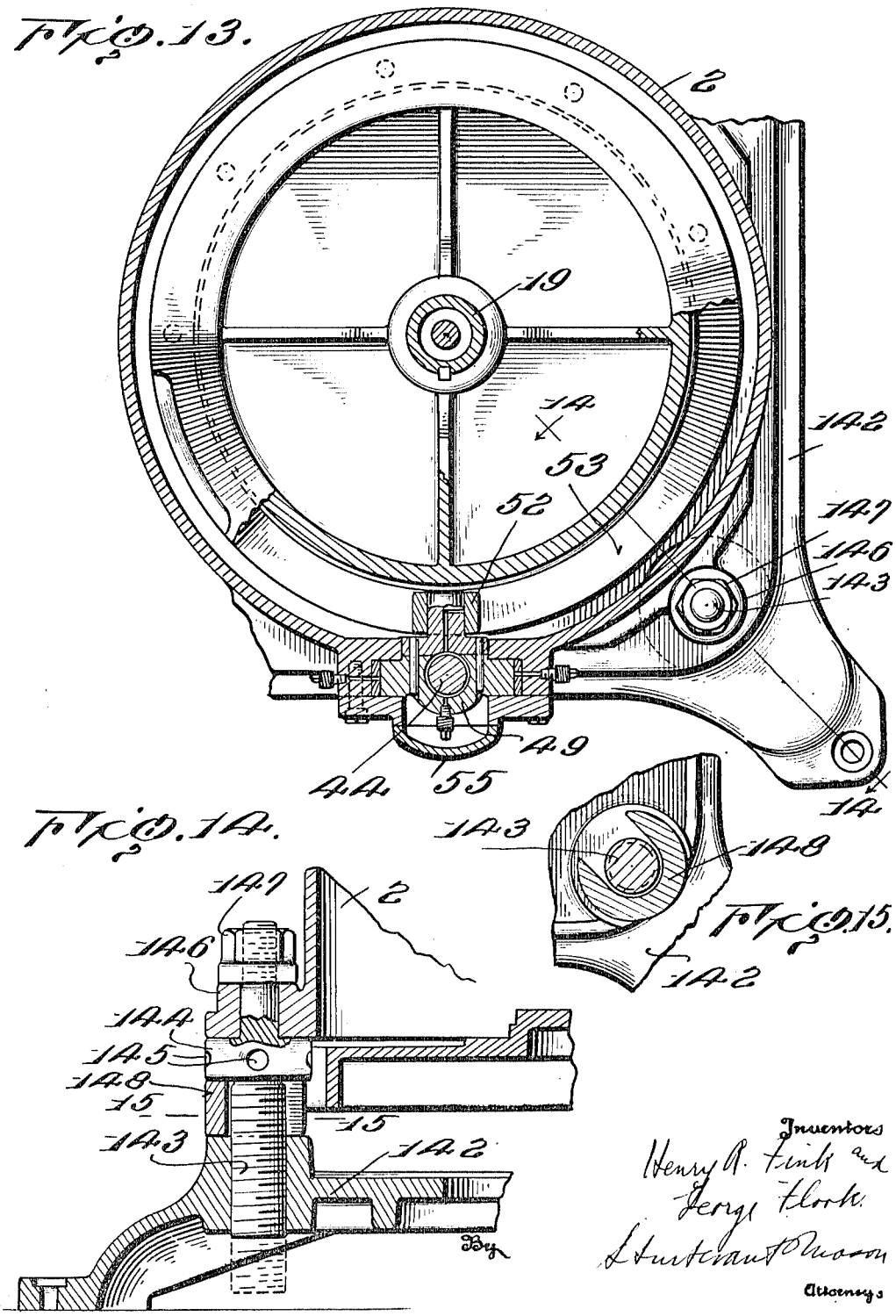

Patented Aug. 30, 1927.

1,640,762

UNITED STATES PATENT OFFICE.

HENRY A. FINK, OF OAK PARK, ILLINOIS, AND GEORGE FLOOK, OF SYRACUSE, NEW YORK, ASSIGNORS TO CONTINENTAL CAN COMPANY, INC., OF NEW YORK, N. Y., A CORPORATION OF NEW YORK.

MACHINE FOR CLOSING FILLED CANS.

Application filed October 17, 1925. Serial No. 63,103.

The invention relates to new and useful improvements in machines for closing filled cans, and more particularly to a machine of the type wherein the seaming head operates about a fixed axis. One type of this machine is shown in the patent to Ivar F. Warme, granted June 24, 1919, No. 1,307,-888.

An object of the invention is to provide a closing machine of the above type having a drum feed with a spiral thread thereon for placing the can beneath the seaming head, with a movable gauge finger which cooperates with the thread on said drum in centering the can beneath the seaming head, which gauge finger is positively held in the path of movement of the can for centering the can and which gauge finger is released to permit the can to pass from the machine after it is closed.

A further object is to provide a closing machine of the above type with means for raising the filled can into cooperative relation with the seaming head, and means for feeding the filled cans beneath the seaming head, wherein these means are so timed that the filled can moves horizontally, then in an upward curved path, and finally in a vertical path into engagement with the seaming head.

A further object of the invention is to provide a machine of the above type with adjustable means for centering the can fore and aft on the supporting pad for the can so as to insure that the can is properly centered relative to the axis of rotation of the seaming head.

A still further object of the invention is to provide a closing machine of the above type wherein the feed drum and the supporting pad are capable of vertical adjustment for cans of different heights or for properly positioning the can relative to the seaming head, and wherein the operating mechanism for the drum consists of a sectional shaft, one part of which is bodily movable up and down with the feed drum, and the other part of which is manually shiftable, and a universal connection between the sections of the shaft so as to insure proper operation of the feed drum when adjusted to different heights.

A still further object of the invention is to provide a machine of the above type having a main transverse shaft in the upper portion of the frame and a vertical shaft extending from the bottom of the machine to a point adjacent the cross shaft, which vertical shaft is driven by a reduction gearing, and on which vertical shaft is keyed a box cam for raising and lowering the supporting pad for the filled cans.

A still further object of the invention is to provide a machine of the above type wherein the cross shaft is utilized for rotating the seaming head, while the vertical shaft is used for operating the seating pad of the seaming head, the cover feed, the marking device for the cover, and the drum feed, as well as the means for raising and lowering the supporting pad for the filled cans.

These and other objects will in part be obvious, and will in part be hereinafter more fully disclosed.

In the drawings which show by way of illustration one embodiment of the invention—

Figure 1 is a plan view of a machine embodying our improvements;

Fig. 2 is a front view of the machine with certain parts in section;

Fig. 3 is a side view of the machine with certain parts in section on the line 3—3 of Fig. 1;

Fig. 4 is a vertical sectional view through the machine on the line 4—4 of Fig. 1;

Fig. 5 is a sectional view on the line 5—5 of Fig. 3;

Fig. 6 is a sectional view on the line 6—6 of Fig. 2;

Fig. 7 is a vertical sectional view through the upper portion of the frame in a plane at right angles to the countershaft which actuates the central vertical shaft, showing said vertical shaft and the means carried thereby for operating the cover feed and the marker;

Fig. 8 is a view partly in section and partly in plan showing the supporting pad for the filled can, the stop finger, the adjustable back gauge, the feed drum and the take-away arm or finger;

Fig. 9 is an enlarged detail showing the centering finger and the take-away arm and the manner of releasing the centering finger to allow the can to pass;

Fig. 10 is a view partly in section and partly in side elevation showing the supporting bracket and the manner of supporting the centering finger;

Fig. 11 is a view partly in vertical section through the threaded feed drum, the supporting pad, and showing more particularly the manner of controlling the cover feeding mechanism by the can which is passing to the closing machine to be closed;

Fig. 12 is a sectional view showing in detail a section of the cover feed shaft and the clutch for connecting the same; also showing the control lever for the clutch and the position of said control lever in dotted lines when the shaft sections are clutched together, so as to release and feed a can end;

Fig. 13 is a sectional view on the line 13, 13 of Fig. 2;

Fig. 14 is a vertical section on the line 14—14 of Fig. 2, and

Fig. 15 is a sectional view on the line 15—15 of Fig. 14.

The invention is directed broadly to a closing machine of the type wherein the can is held stationary while the seaming head rotates about the same to double seam the can end on to the can body, and wherein said can is raised by a vertically movable supporting pad into proper cooperative relation to said seaming head, said can on its upward movement passing through a tapered ring which rounds up the can body and insures the placing of the can end properly on the can body, which can end has been previously placed on the can end seat at the upper side of said tapered ring. The can end is placed on said can end seat by a rotating arm which receives the can end from beneath a stack holder at one side of the seaming head. The operation of said arm for moving a can end on to the can end seat, and the releasing of the can end from the stack is controlled by the filled can as it is fed into the machine, so that if there is no can to be closed, no can will be placed on the seat. The can end is marked as it passes from beneath the stack holder on to the can end seat, by cooperating rotating dies which impress the mark in the can end. The filled can to be closed is placed on a supporting pad by means of a feed drum having a spiral thread thereon, which pushes the can along a horizontal support on to said supporting pad. This thread is so timed and shaped relative to the upward movements of the supporting pad as to force the can only partially on to the supporting pad before the supporting pad begins its upward movement, and the thread continues to move the can on to said supporting pad until it is properly centered underneath the tapered ring. The thread on the rotating drum has an increased thickness at the extreme end thereof, so that it may continue to push the can on to the pad as the pad is moving up. The result of the upward movement of the supporting pad and the forward movement of the can through the action of the thread of the drum thereon, is a curved path of travel for the filled can from its horizontal level to its line of vertical movement. Associated with this supporting pad is a centering finger which is positively held in the path of the can so as to cooperate with the thread on the drum in the centering of the can on the supporting pad. There is a guide at the rear of the supporting pad which cooperates with the centering finger and the threaded drum, and these three elements insure that the can will be centered directly beneath the tapered ring and the seaming head whereby it may be raised without being jostled or tilted so as to cause spilling. This centering finger which is positively held in place during its active centering operation is released so that the can after it is closed, may be stripped or removed from the supporting pad by the take-away arm. The can end is seated in the can body by a seating pad associated with the seaming head, and this seating pad operates also to strip the can after it is closed from the holding chuck of the seaming head. The machine is provided with a main shaft extending transversely thereof adjacent its upper end, which is geared to a supporting spindle for the seaming head, and rotates the same at a high speed. Directly beneath this main shaft is a vertical shaft which is operated by a reduction worm gear connection with the countershaft which in turn is operated by a gear connection with the main shaft. This vertical shaft which extends to the bottom of the machine is provided at the lower end thereof with a box cam which is fixed to the shaft, and this box cam operates upon suitable devices connected to the supporting pad for raising and lowering the same. This vertical shaft also operates through suitable devices, the drum feed which places the cans on the supporting pad. It also operates through suitable devices, the cover feed and marking devices. This vertical shaft likewise operates box cams located at the upper end thereof and keyed to the shaft, which box cams in turn raise and lower the seating pad of the seaming head, and also operate the cams which in turn actuate the seaming levers carrying the first and second operation seaming rolls.

The cans are fed on to the threaded drum by a rotating disk which receives the cans promiscuously, and guides are associated therewith for lining up the cans and feeding them in succession on to the support associated with the drum. There is also associated with this rotating disk a timing screw which retards the forward movement of the can and delivers the same in proper timing for the thread of the drum to take the cans, one at a time. This timing screw also insures proper separation of the delivered can from those following, so that the thread may get behind the can without striking or jostling the filled can.

Referring more in detail to the drawings, my improved closing machine consists of a main frame structure 1 carried by a supporting base structure 2, and at the upper end of the vertical frame structure 1 is a head frame 3. Mounted in the head frame 3 is a horizontal shaft 4, which is the main operating shaft. This shaft is driven by a belt wheel 5. Between this belt wheel 5 and the shaft 4 is a suitable friction clutch which is operated by means of a lever 6 connected by a suitable link to a rock lever 7 which in turn is connected by a link 8 to an operating hand lever 9.

Also mounted in the head frame 3 is a seaming head 10. This seaming head is carried by a sleeve or spindle 11 mounted in suitable ball bearings and carrying at its upper end a bevel gear 12, which meshes with a bevel gear 13 keyed to the forward end of the shaft 4. As the shaft 4 rotates, it will revolve the seaming head at a higher rate of speed.

The main shaft carries a pinion 14 which in turn meshes with a pinion 15 carried by a countershaft 16. This shaft 16 is mounted in a lateral extension of the head frame 3. Mounted on this countershaft 16 is a worm gear 17 and the worm gear 17 meshes with a worm gear 18 rigidly secured to the upper end of a vertical shaft 19. This vertical shaft 19 is mounted in suitable bearings in the vertical frame 1 of the machine. This driving connection for the vertical shaft affords a reduction gearing, so that the vertical shaft 19 is rotated at a relatively slow speed compared with the speed of the main shaft which rotates the seaming head. Keyed to the upper end of the vertical shaft is a double box cam 20. This double box cam operates, respectively, the levers 21 and 22. The lever 22 is connected to a rod 23 which in turn carries the seating pad associated with the seaming head. The lever 21 moves the sleeve 24 up and down, and this sleeve carries the cams for operating the seaming levers which are indicated at 25 and 26 in Fig. 4 of the drawings. This structure of the seaming head, together with the means for actuating the parts stated, is shown in detail in the patent to Warme above referred to, and further description thereof is not thought necessary. Associated with this seaming head is a bracket 27, which bracket is fixed to the vertical frame 1 of the machine. This bracket 27 has a tapered opening 28 through which the filled can is raised, and which operates to round up the can if it is out of true. At the upper edge of the tapered ring there is a can end seat 29. The can as it moves up through the tapered ring engages the can end. The seating pad moves down into contact with the can end and seats the can end in the filled can, and then moves up with the filled can until it is properly chucked. This tapered ring and seating pad construction is likewise shown and fully disclosed in the Warme patent above referred to.

The filled cans to be closed are delivered at random on to a rotating disk 30. This rotating disk is operated by a worm gear drive 31 carried by a shaft 32 beneath the disk, and this shaft 32 is actuated by a sprocket chain 33. The same sprocket chain operates a timing screw 34. The disk 30 and the timing screw 34 feed the cans, one at a time, on to a support 34 and against a guide rail 36. A feed drum 37 having a spiral thread 38 formed thereon moves the cans along this support 35 on to a supporting pad 39.

Associated with the rotating disk 30 is a stationary guide rail 40 which is eccentric to the center of rotation of the disk 30 and so disposed that the filled cans are carried by the disk into contact with this guide rail. There is another stationary guide rail 41 associated with the guide rail 40, and between these two guide rails is a comparatively narrow passageway so that only one can at a time will be carried along the guide rail 40. The disk 30 rotates at a faster speed than the timing screw and will carry the cans against the timing screw, which will retard the cans and deliver the same, one at a time, at proper timed intervals, so that the receiving end 42 of thread 38 will pass behind the can and slide the can along the support 35. This timing screw has its thread thickened at the delivery end thereof as indicated at 43 in the drawings. The timing screw is shown and described in my co-pending application filed of even date herewith, and further detail reference to this structure and mode of operation is not thought necessary. The essential feature consists in the feeding of the cans, one at a time, so as to be taken up by the receiving end of the thread on the feed drum, and the thread on the feed drum then feeds the cans forward and places a can, at proper timed intervals, on the supporting pad 39. This supporting pad is raised and lowered, and the drum places a can on the supporting pad and gives a sufficient interval of time before another can is ready to be delivered to the supporting pad for the complete upward and downword movement of the supporting pad. Thus it is that the can is raised and closed, then lowered and taken from the machine before the drum has advanced the next filled can for delivery on to the supporting pad. The thread of the drum is properly constructed so as to receive the cans following very closely, one after another, at the receiving end of the drum, and to deliver the cans at the delivery end of the drum in proper timed intervals for the seaming operation upon the cans. This supporting pad is fixedly secured to the upper end of a standard 44. Mounted on the forward side of the vertical frame 1 is a bracket 45. This bracket is secured to the frame 1 by suitable bolts 46. The bracket is likewise supported by an adjustable sleeve 47 which is provided with a thread fitting the threaded supporting collar 48 carried by the supporting base 2 of the machine. When the bolts 46 are loosened, and the supporting collar 48 rotated, the bracket 45 can be raised or lowered. This will raise and lower the feed drum and the support along which the filled cans are fed, as will be more fully described hereinafter. The standard 44 reciprocates in this sleeve 47. This standard is provided with a threaded portion at its lower end on which is placed a sleeve 49. The sleeve can be adjusted along the threaded portion of the standard by the threaded collars 50 and 51. This is for the purpose of raising or lowering the supporting pad to conform to any raising or lowering of the bracket 45, and the adjustment of the bracket 45 is for the purpose of setting the machine so as to operate upon cans of different heights. The standard 44 may also be raised or lowered so as to insure a proper raising of the filled cans and the chucking of the same relative to the seaming head. This standard 44 is raised and lowered by means of a roller 52 which runs in a box cam 53 keyed to the lower end of the vertical shaft 19. This box cam rests upon a ball bearing 54 carried by the supporting base 2 of the machine.

There is a door 55 hinged at 56 to the other side of the supporting base 2 which closes an opening which in turn gives access to the collars 50 and 51 for adjusting the same to raise or lower the supporting pad.

The feed drum 37 is mounted on a horizontal shaft 57 (see Figures 2 and 11). This shaft 57 is mounted in suitable bearings carried by the supporting bracket 45. Keyed to this shaft 57 is a flange plate 58, and this flange plate is secured by bolts 59 to the feed drum 37. The forward end of the shaft 57 is journaled in a suitable bearing 60 carried by the bracket 45. On the extreme end of this shaft 57 is a bevel gear 61 which meshes with a bevel gear 62 carried by a cross shaft 63 which is the driving shaft for the threaded drum, and likewise for the rotating disk 30 and the timing screw 34. It will be noted that the supporting pad 39 has a flat side 64 and the end of the drum 37 comes right up close to this flat side. The drum rotates in the direction of the arrow in Fig. 8. The end of the thread 38 is thickened or enlarged as indicated at 65 in Fig. 8. The upper face of the supporting pad 39 when in extreme lower position is on a level with the support 35, and the center portion of the feed drum. The filled can being moved along the support and drum by the thread 38 will be pushed over and on to the supporting pad 39. The upward movement of this supporting pad is so timed relative to the movement of the drum that after a filled can has moved part way over said supporting pad, the pad starts on its upward movement and will begin to lift the filled cans. This occurs while the portion 65 of the thread is still moving the can forward, and this is the reason for increasing the thickness of the thread so that it may retain its feeding movement on the filled can as the supporting pad starts upward. It will readily be seen that if the can begins its upward movement before it is moved to a position centered over the supporting pad where it must stop, it begins an upward movement while it is still moving horizontally, and therefore, the path of travel of the filled can is in a curved path from the horizontal to the vertical, rather than in a straight path horizontal to a position centrally over the supporting pad, and then in a vertical direction at right angles to its horizontal path of travel. This curved and upward movement of the filled can as it comes to a stop in its forward movement prevents any spilling of the contents of the can, which does occur when a filled can is brought to a sudden standstill over the supporting pad. The supporting pad 39, of course, moves upward to the postion shown in Fig. 11, which is a considerable distance above the support 35 and the drum 37, but before the filled can is moved away from the thread, it is centered on this supporting pad and is stationary thereon. To aid in this centering of the can on the supporting pad, I have provided an adjustable back gauge or guide 66, and I have also provided a pivoted gauge or stop finger 67. Said gauge or stop finger 67 is pivoted at 68 to a bracket 69 (see Figures 2, 4, 8, 9 and 10). This bracket 69 is secured to the main bracket 45 by means of bolts 70 which pass through slots in the bracket and serve to permit the adjustment of the bracket toward and from the supporting pad. This stop or gauge finger 67 is formed integral with a short vertical stem 71 which extends down through the supporting portion 72 of the bracket 69. A spring 73 is mounted on the lower end of this stem 71 and a nut 74 threaded on the lower end of the stem forces the spring against the supporting member 72. This spring is solely for the purpose of preventing sudden movements of the gauge or stop finger 67.

In Fig. 8 of the drawings, the position of the filled can is indicated by the line C. It is noted that the gauge or stop finger 67 is provided with two contact points 75 and 76 which engage the filled can body. The thread of the drum forces the can on to the supporting pad and until it comes in contact with this gauge finger, and the gauge or guide 66 cooperates with this finger, in the centering of the can on the supporting pad, not necessarily so that its center is coincident with the center of the supporting pad, but rather so that its center is coincident with the center of the tapered ring and the axis of rotation of the seaming head. This gauge finger 67 and the gauge or guide 66 are a sufficient distance above the supporting pad as clearly shown in Figures 2 and 11 of the drawings, so that the supporting pad may be raised to its full height without moving the can above these guiding elements.

After the can has been closed, then the supporting pad is lowered and the can is stripped from the supporting pad by a rotating arm 77. Said rotating arm 77 is carried by a shaft 78, and the shaft rotates continuously during the operation of the machine. The arm 77 sweeps across the supporting pad and will move the can in a forward direction into the discharge chute 79. It is noted that the discharge chute 79 is in line with the longitudinal axis of the feed drum, and that the cans after they are closed, are continued in the same forward direction as they are brought into the machine. This enables the cans to be quickly taken from the supporting pad so as not to in any way interfere with the next following can which is to be closed. The shaft which carries the take-away arm 77 also performs the function of holding the gauge finger in its proper position for centering the can on the supporting pad. This is accomplished by providing said shaft with an adjustable collar 80 which has one side thereof slabbed as indicated at 81 in Fig. 9 of the drawings. When the concentric portion of this collar engages the gauge finger 67, it will hold the finger over the supporting pad and in proper position for centering the filled can thereon. When, however, the take-away arm 77 rotates to a position to engage and remove the closed can as shown in Fig. 9, then the slab side 81 of the adjustable collar 80 permits the gauge finger to swing away from the supporting pad and from the guide rail 66 and also permits the closed can to pass on out of the machine. This gauge finger 66 is also provided with a stop pin 82 (see Fig. 2) which prevents said gauge finger from moving out of proper operating position.

Mounted on the bracket 45 is an auxiliary bracket 83 which carries a guard 84 which protects the operator from the rotating take-away arm 77. In order to prevent the supporting pad 39 from turning on its support, said pad is provided with a keyway in which a key 85 secured to the frame of the machine is placed.

Mounted on the shaft 78 which carries the take-away arm 77 is a gear 86. This gear 86 meshes with a gear 87 carried by the shaft 63 which operates the drum feed. These gears 86 and 87 are helical gears. This shaft 63 is made in two sections, the outer section which has been lettered in the drawing as 63, and the inner section which has been lettered 63ª. The section 63 of the shaft is mounted in suitable bearings in the bracket 45, and of course, this section will be raised and lowered with the bracket 45. The section 63ª is mounted in bearings in the bracket 88 which is manually shifted on the vertical portion 1 of the frame, and held in adjusted position by suitable bolts, 89, 89, passing through slots 90 in the bracket. The frame 1 adjacent this bracket has an opening formed therein, and the bracket has an inwardly projecting portion 88ª which extends through this opening and the inner end of this projecting portion 88ª is forked as indicated at 91 in Fig. 5. Mounted on the vertical shaft 19 is a helical gear 92. This helical gear is splined to the shaft 19, and is capable of an endwise movement thereon. The gear rests between the upper and lower forked ends 91 of the projecting portion 88ª of the bracket 88. When this bracket 88 is adjusted up or down, it will slide the helical gear 92 on the vertical shaft 19. This helical gear 92 meshes with a helical gear 93 which is rigidly connected to a sleeve 94 in which the section 63ª of the shaft is mounted. The shaft 19 rotates the helical gears, and these helical gears in turn rotate the sleeve 94. On the end of the section 63ª of the shaft is a collar 95. The sleeve has a collar 96 and a shearing pin 97 is inserted in openings in the collars 95 and 96. The collar 95 is rigidly attached to the shaft 63, and therefore, the helical gears rotating the sleeve 94, will, through the collar 96 and the shearing pin and the collar 95, impart rotations to the shaft 63ª. The shaft section 63ª has a universal connection 97ª with the shaft 63. If, when adjusting the bracket 88 in which the shaft section 63ª is mounted, these two shaft sections are not quite brought into alinement, the universal connection between them will take care of any non-alinement. Mounted on this shaft 63ª is a sprocket wheel 98 over which a sprocket chain 99 runs. This sprocket chain operates the devices carrying the overflowing pad 100, which moves down into the filled can as it is carried along by the drum for overflowing the liquid content of the can. This overflowing device forms no part of my invention.

The bracket 27 is extended laterally as shown in Fig. 2, and a holder 101 for the stacked can ends is mounted on this bracket. The can ends are released one at a time from the stack holder and drop on to a can end race 102. The can ends are moved along this race by a rotating arm 103 fixed to the lower end of a shaft 104. This rotating arm and can end race are similar in construction to those shown in the patent granted C. E. Bratt and George Fluck, August 9, 1921, No. 1,387,098. The shaft 104 has a bevel gear 105 at its upper end which meshes with a bevel gear 106 on a short shaft 107 mounted in a bracket 108 attached to the frame of the machine. A shaft 109 is in alinement with the shaft 107 and this shaft 109 is mounted in a suitable bracket 110 attached to the main frame of the machine. The shaft 109 carries a bevel gear 111 which meshes with a bevel gear 112 which in turn is mounted on a short stub shaft 113 carrying a pinion 114 which meshes with a pinion 115 mounted on the bracket 110. The pinion 115 meshes with a pinion 116 on the vertical shaft 19. Thus it is that the vertical shaft 19 rotates the shaft 109. Attached to this shaft 109 is a sleeve 117 (see Fig. 12). Pivotally mounted on said sleeve 117 is a clutch dog 118. Said dog is mounted on a pivot 119. On the end of the shaft 107 is a collar 120. Said collar is provided with a lug 121. A spring 122 is seated at one end in the sleeve 117, and at its other end bears against the clutch dog 118. This tilts the clutch dog so that the end thereof will strike the lug 121 and rotate the shaft 107. The collar 120 is in reality carried by the hub of the gear 106, and the gear and shaft 107, turn as one. The rotations of the shaft 19 will impart a rotation to the shaft 109, which, through the clutch dog 118, will rotate the shaft 107, and the shaft 107, through the bevel gear carried thereby will rotate the shaft 104 and the arm 103 which moves the can end along the can end race on to the seat for the can end at the upper side of the tapered ring. A suitable lever mechanism 123 is also actuated by the shaft 104 which operates to release the can ends one at a time from the stack. The purpose of the clutch dog 118 is to throw out the can end releasing mechanism and the can end feed when there is no can to be closed.

Alongside of the feed drum 37 there is a swinging plate 124. This swinging plate is pivoted on a rod 125. The arms carrying the plate extend below the guide rail 36 and the plate projects in front of the guide rail so that when a can is moved along by the feed drum it will engage this plate 124 and swing said plate rearwardly. In order to prevent the can from being forced forward, by this plate, a front guide rail 126 is provided. When this plate 124 is pushed back, it will lift the rod 127 and this will rock the shaft 128, thus swinging the arm 129 to the dotted line position shown in Fig. 12. In this position, the member 130 carried at the upper end of the arm 129 is out of the path of rotation of the lug 131 on the outer end of the clutch dog 118, and therefore, the spring 122 will move said clutch dog so as to cause the two shaft sections 109 and 107 to be clutched together. When these are clutched together, then the can end feed will cause a can end to be fed to the seaming head for the purpose of closing the filled can passing the plate 124. When no can is passing the plate 124, then it will swing forward, pulling down on the arm carried by the rock shaft 128, and swing the arm 129 into the path of the lug 131 which will cause the clutch dog to move so as to pass the lug 121 and no rotation will then be imparted to the can end feed.

A spring 130$^a$ connected to the frame of the machine and to the arm 129 operates to swing the plate 124 forward and holds the arm 129 so that the clutch dog is released and no can end released or moved on to the can end seat.

As noted above, the can ends are released by a suitable lever mechanism 123. This lever mechanism is pivotally connected to the bracket 27 by a pivot pin 123$^a$, which serves as a fulcrum for the lever. Mounted on the shaft 104 is an eccentric 104$^a$. This eccentric passes through the lever 123 and will oscillate the lever on its fulcrum pin when the shaft 104 rotates. Said lever has a projecting ear 123$^b$ to which is connected a link 150. This link is pivotally connected to the lever 123 by means of a pivot pin 151. The link 150 is pivotally connected at 152 to a stud 153 carried by a ring 154 which is mounted to oscillate in the base of the stack holder. This ring operates the stack supporting and can end releasing devices 155 (see Fig. 1). When the shaft 104 is roated, it will not only, therefore, rotate the arm 103, but it will oscillate the can end releasing ring 154 so that a can end is released just in advance of the rotating arm 103, and the arm 103 will move the can end along the can end race 102 on to the can end seat 29 beneath the seaming head. Inasmuch as the shaft 104 operates both the can end releasing means and the means which carries the can end beneath the seaming head, it will be noted that no end is released and no movement of the can end feeding arm takes place, except when the portion 107 of the sectional shaft is coupled up to the portion 109 thereof. This occurs when a filled can is fed into the machine. The can itself automatically sets into motion the mechanism which releases the can end and places it on the can end seat beneath the seaming head, and this all takes place, of course, prior to the movement of the upper end of the filled can through the tapered ring so that the can end is picked up by the upwardly moving filled can and the can end carried against the chuck of the seaming head.

The can ends as they pass along the raceway are marked by cooperating marking dies 132 and 133. The marking die 132 is carried by a shaft 134, while the marking die 133 is carried by a shaft 135. The shaft 134 carries a gear 136 which meshes with a gear 137 and the shaft 135 carries a gear 138 which likewise meshes with this gear 137. As clearly shown in Fig. 7 of the drawings, the gear 137 is mounted on a short shaft 139. At the inner end of this short shaft is a bevel gear 140 which meshes with a bevel gear 141 on the vertical shaft 19.

The supporting base 1 of the closing machine is mounted on a main base member 142 (see Figures 2, 13 and 14). Adjacent the four corners of the main base member 142 there are threaded sleeves, in each of which is mounted a threaded support 143. This threaded support carries a collar 144 provided with suitable openings 145 by which the support can be rotated. The upper end of the support freely extends through an ear 146 cast integral with the supporting base 1. On the upper end of this support 143 is a nut 147. When the nut 147 is loosened, then the threaded support 143 can be turned and thus moved into or out of the main supporting base member 142. When it is moved out of said base member, then the machine will be raised. An open-sided washer 148 is placed between the main base member 142 and the supporting base 1 of the machine, and the collar of the sleeve 144 turned down on to said open-sided washer 148. The nut 147 is then turned down and this will securely hold the machine in its adjusted position on the main supporting base member. The purpose of this adjustment for raising and lowering the machine is for the placing of the machine on the same level as the filling machine from which the filled cans are delivered on to the rotating disk 30. It is desired that the filled cans as they are moved from the filling machine into the closing machine shall slide along from one machine into the other without being tilted or jostled so as to spill the contents thereof. This is greatly aided by the placing of the receiving disk of the closing machine on the same level as the discharge disk of the filling machine.

It is hardly thought necessary to describe in detail the operation of the machine, as this has been described in connection with the various mechanisms which have been brought together in the organization of the closing machine. It may be stated briefly, however, that filled cans are received at random by the rotating feeding-in disk, are lined up by the associated guides and fed one at a time, at proper timed intervals to the feed drum of the closing machine. The feed drum takes these cans, one at a time, and conveys them to the supporting pad for the filled cans, and the filled can is centered on said supporting pad and raised into cooperative relation with the rotating seaming head. The can ends are released from the stack when a can is to be closed, and the can end is placed on the seat above the tapered ring through which the upper end of the filled can is lifted. Thus it is that the can end is placed on the filled can. The seating pad seats the can end in the can and cooperates with the raising and supporting pad for the filled cans in the presenting of the end and the can to the seaming head so that the edge flange of the can end is rolled into a double seam with the flange on the can body.

As has already been stated, the filled can is moved by the threaded drum beneath the seaming head. The vertically movable supporting pad begins its upward movement before the filled can is fully moved on to the same. Therefore, the filled can moves first in a horizontal direction, then in an upwardly curved direction, and finally in a vertical direction. The cans continue to move all the time and do not come to a standstill until they are brought into engagement with the chuck of the seaming head. The tapered ring for rounding up the can is located underneath the seaming head, but close to it, so that the can is in its vertical path of movement when passing through the tapered ring. While the filled can is centered on the supporting pad when it is moved thereon by the threaded drum, this tapered ring further aids in accurately centering the can and rounding it up so that the can end may be seated therein, and the can end firmly placed against the chuck of the seaming head.

It will be noted that in my improved closing machine the filled cans are received at random on to the receiving disk and at once are moved forward, lined up, spaced and delivered at proper timed intervals to the vertically moving supporting pad which carries the can to the seaming head. It has a continuous movement from the time it starts on the receiving disk until it is chucked against the seaming head and the end firmly seated therein. This continuous movement is in a forward direction without any stops or right-angle movements, and therefore, there is little or no spilling of the contents of the can.

It is to be noted that the feed drum, the take away arm, the cover releasing and feeding mechanism, and the marker, are all operated from the vertical shaft in the main frame of the closing machine. The cover feeding mechanism and the operating mechanism therefor are stationary on the main frame in the sense that the seaming head is stationary thereon, that is, these parts are not adjusted in any way for different size cans. They do not need to be adjusted. The same is true of the marking mechanism. The drum feed operating mechanism, the supporting pad and take away arm are adjusted for different size cans as has been fully set forth.

It is obvious, however, that so far as the cover feed mechanism is concerned, the seaming head might be moved up and down therewith as well as the tapered ring. In other words, the cover feed and the tapered ring are always maintained in a predetermined relation to the position of the seaming head. While I prefer to use a rotating seaming head, it will be understood, of course, that a rotating chuck may be used for rotating the can to be closed, in which case, the seaming rolls of the seaming head would not rotate about the can. The improved gauge finger for cooperating with the feed drum and rear guide rail for centering the can beneath the seaming head may be used in conjunction with other types of seaming heads, as for example, a seaming head which is movable up and down to bring the same into cooperative relation with the can to be closed.

It is obvious that minor changes in the details of construction and the arrangement of the parts may be made without departing from the spirit of the invention as set forth in the appended claims.

Having thus described the invention, what we claim as new and desire to secure by Letters-Patent, is—

1. A filled can closing machine comprising a seaming head operating in a fixed position, mechanism for moving a filled can horizontally in a direction beneath the head, then in a curved path, upwardly toward the head, and finally in a vertical path into cooperative engagement with the head.

2. A filled can closing machine comprising a seaming head operating in a fixed position, means for moving a filled can horizontally beneath said head, means for moving said filled can vertically into engagement with the head, said horizontal moving means and said vertical moving means being so timed as to move a filled can bodily, first horizontally and then in a curved upward path, and finally in a vertical path.

3. A filled can closing machine comprising a seaming head, a stationary tapered ring located beneath the seaming head, said tapered ring having a can end seat at the upper side thereof, means for moving a filled can bodily in a horizontal direction beneath the tapered ring, thence in a curved path upwardly, and finally in a vertical path through the tapered ring whereby a filled can is rounded up and the can end seated thereon, and said can and can end moved into cooperative relation with said seaming head.

4. A filled can closing machine comprising a seaming head, a stationary tapered ring located beneath the seaming head, said tapered ring having a can end seat at the upper side thereof, means for moving a filled can bodily in a horizontal direction beneath the tapered ring, thence in a curved path upwardly, and finally in a vertical path through the tapered ring whereby a filled can is rounded up and the can end seated thereon, and said can and can end moved into cooperative relation with said seaming head, and means controlled by a filled can moving beneath the tapered ring for placing a can end on the can end seat.

5. A filled can closing machine comprising a seaming head operating in a fixed position, a vertically moving suporting pad for lifting the filled can into cooperative relation with the seaming head, means for moving the filled can bodily underneath the head on to said supporting pad, said last-named means being so timed relative to the vertical movement of the suporting pad as to move the filled can on to the supporting pad during the first portion of the upward movement of the supporting pad, a stationary tapered ring located beneath the seaming head through which the uper end of the filled can passes for rounding up the can, a can end seat above said tapered ring, said stationary tapered ring being so disposed that the upper end of the filled can passes therethrough when the filled can is on its vertical movement.

6. A filled can closing machine comprising a seaming head operating in a fixed position, a vertically moving supporting pad for lifting the filled can into cooperative relation with the seaming head, means for moving the filled can bodily underneath the head on to said supporting pad, said last-named means being so timed relative to the vertical movement of the supporting pad as to move the filled can on to the supporting pad during the first portion of the upward movement of the supporting pad, a stationary tapered ring located beneath the seaming head through which the upper end of the filled can passes for rounding up the can, a can end seat above said tapered ring, said stationary tapered ring being so disposed that the upper end of the filled can passes therethrough when the filled can is on its vertical movement, and means controlled by the filled can while on its movement toward the supporting pad for placing a can end on the seat above the tapered ring.

7. A filled can closing machine comprising a seaming head operating in a fixed position, a supporting pad located beneath said seaming head and movable vertically for carrying a filled can into cooperative relation with the seaming head, a horizontal support, a threaded drum associated with said horizontal support for moving a filled can on to said supporting pad, said thread on the drum being timed and disposed relative to the upward movement of said supporting pad so as to move said filled can on to said supporting pad during the initial upward movement of said supporting pad whereby said filled can is bodily moved in a curved path from its horizontal movement to its vertical movement and without stopping.

8. A filled can closing machine comprising a seaming head operating in a fixed position, a supporting pad located beneath said seaming head and movable vertically for carrying a filled can into cooperative relation with the seaming head, a horizontal support, a threaded drum associated with said horizontal support for moving a filled can on to said supporting pad, said thread on the drum being timed and disposed relative to the upward movement of said supporting pad so as to move said filled can on to said supporting pad during the initial upward movement of said supporting pad whereby said filled can is bodily moved in a curved path from its horizontal movement to its vertical movement and without stopping, a stationary tapered ring located beneath said seaming head through which the upper part of the can is passed during the final portion of its upward movement for rounding up the can, and a can end seat above the tapered ring for placing a can end on said upwardly moving filled can.

9. A filled can closing machine comprising a seaming head operating in a fixed position, a vertically moving supporting pad for lifting the filled can into cooperative relation with said seaming head, a horizontal support along which the filled cans are moved beneath the seaming head, a feed drum having a spiral thread thereon for moving the filled cans along the horizontal support, said feed drum terminating close to the vertically movable supporting pad and having said spiral thread terminating at the end of the drum and so positioned on said drum as to move a filled can on to said supporting pad and centering said can beneath the seaming head, said thread also operating to move the can on to the supporting pad during the initial portion of its upward movement whereby said filled can is caused to move bodily, first in a horizontal direction beneath the seaming head, then in an upwardly curved path, and finally in a vertical path into cooperative relation with the seaming head and without stopping in its movement until in engagement with the seaming head.

10. A filled can closing machine comprising a seaming head operating in a fixed position, a vertically moving supporting pad for lifting the filled can into cooperative relation with said seaming head, a horizontal support along which the filled cans are moved beneath the seaming head, a feed drum having a spiral thread thereon for moving the filled cans along the horizontal support, said feed drum terminating close to the vertically movable supporting pad and having said spiral thread terminating at the end of the drum and so positioned on said drum as to move a filled can on to said supporting pad and centering said can beneath the seaming head, said thread also operating to move the can on to the supporting pad during the initial portion of its upward movement whereby said filled can is caused to move bodily, first in a horizontal direction beneath the seaming head, then in an upwardly curved path, and finally in a vertical path into cooperative relation with the seaming head and without stopping in its movement until in engagement with the seaming head, said thread at the end of the drum being increased in thickness vertically whereby said thread maintains its engagement with the filled can during the initial upward movement thereof.

11. A filled can closing machine comprising a seaming head operating in a fixed position, a vertically moving supporting pad for lifting the filled can into cooperative relation with said seaming head, a horizontal support along which the filled cans are moved beneath the seaming head, a feed drum having a spiral thread thereon for moving the filled cans along the horizontal support, said feed drum terminating close to the vertically movable supporting pad and having said spiral thread terminating at the end of the drum and so positioned on said drum as to move a filled can on to said supporting pad and centering said can beneath the seaming head, said thread also operating to move the can on to the supporting pad during the initial portion of its upward movement whereby said filled can is caused to move bodily, first in a horizontal direction beneath the seaming head, then in an upwardly curved path, and finally in a vertical path into cooperative relation with the seaming head and without stopping in its movement until in engagement with the seaming head, a tapered ring located beneath the seaming head through which the upper end of said filled can passes while in its vertical path of movement whereby said can is rounded up, and a can end seat above the tapered ring for holding a can end so that said upwardly moving filled can will engage the same prior to moving into cooperative relation with the seaming head.

12. A filled can closing machine comprising a seaming head operating in a fixed position, a vertically moving supporting pad for lifting the filled can into cooperative relation with said seaming head, a horizontal support along which the filled cans are moved beneath the seaming head, a feed drum having a spiral thread thereon for moving the filled cans along the horizontal support, said feed drum terminating close to the vertically movable supporting pad and having said spiral thread terminating at the end of the drum and so positioned on said drum as to move a filled can on to said supporting pad and centering said can beneath the seaming head, said thread also operating to move the can on to the supporting pad during the initial portion of its upward movement whereby said filled can is caused to move bodily, first in a horizontal direction beneath the seaming head, then in an upwardly curved path, and finally in a vertical path into cooperative relation with the seaming head and without stopping in its movement until in engagement with the seaming head, a tapered ring located beneath the seaming head through which the upper end of said filled can passes while in its vertical path of movement whereby said can is rounded up, a can end seat above the tapered ring for holding a can end so that said upwardly moving filled can will engage the same prior to moving into cooperative relation with the seaming head, and means controlled by the filled can while moved by the threaded drum for placing a can end on said can end seat.

13. A filled can closing machine comprising a seaming head operating in a fixed position, a vertically movable supporting pad for raising the filled can into cooperative relation with the seaming head, a feeding mechanism including a feed drum having a spiral thread for moving the filled cans on to the supporting pad, said vertically movable supporting pad being timed relative to the movement of the feeding mechanism so that a filled can is moved on to the supporting pad during the initial upward movement thereof, whereby said filled can is moved first horizontally, then in an upwardly curved path, and finally in a vertical path into engagement with the seaming head without stopping until in engagement with the head, a rotating receiving disk for receiving the filled cans at random, and devices cooperating with said disk and said threaded drum for delivering said cans, one at a time, to said feed drum so that the thread on the drum will pass in rear of the filled can delivered thereto and move the same underneath the seaming head, said disk and devices operating to move a can continuously without tilting or jostling the same, whereby the filled cans are received at random and are moved, one at a time, into cooperative relation with the seaming head with little or no spilling of the contents thereof.

14. A filled can closing machine comprising a seaming head operating about a fixed vertical axis, a feeding mechanism for placing a filled can beneath the seaming head comprising a rotating drum having a spiral thread formed thereon for moving the filled can beneath the seaming head, said drum and thread being so positioned and timed as to center the filled can beneath the seaming head, a stop located in the path of movement of the can beneath the seaming head for cooperating with said drum in the centering of the can beneath the seaming head and means for releasing said stop so as to permit the same to move out of the path of the closed can as it moves from beneath the head.

15. A filled can closing machine comprising a seaming head operating about a fixed vertical axis, a feeding mechanism for placing a filled can beneath the seaming head comprising a rotating drum having a spiral thread formed thereon for moving the filled can beneath the seaming head, said drum and thread being so positioned and timed as to center the filled can beneath the seaming head, a movable stop located in the path of movement of the can beneath the seaming head for cooperating with said drum in the centering of the can beneath the seaming head, and a rotatable arm for moving the closed can from beneath the seaming head, said movable stop being released by said rotating arm so as to move out of the path of the closed can as it is moved from beneath said head.

16. A filled can closing machine comprising a seaming head operating about a fixed vertical axis, a feeding means for feeding the filled cans beneath said head, including a drum having a spiral thread thereon, a swinging finger located in the path of movement of the filled can beneath the head, and cooperating with the spiral thread for positively centering the filled can beneath the seaming head, and means for positively holding said finger in position for centering the can and for releasing said finger to allow the can to be moved from beneath the seaming head after it is closed.

17. A filled can closing machine comprising a seaming head operating about a fixed vertical axis, a feeding means for feeding the filled cans beneath said head, including a drum having a spiral thread thereon, a swinging finger located in the path of movement of the filled can beneath the head, and cooperating with the spiral thread for positively centering the filled can beneath the seaming head, means for positively holding said finger in position for centering the can and for releasing said finger to allow the can to be moved from beneath the seaming head after it is closed, and means for supporting said swinging finger whereby the position thereof may be adjusted.

18. A filled can closing machine comprising a seaming head operating about a fixed vertical axis, a feeding means for feeding the filled cans beneath said head, including a drum having a spiral thread thereon, a swinging finger located in the path of movement of the filled can beneath the head and cooperating with the spiral thread for positively centering the filled can beneath the seaming head, means for positively holding said finger in position for centering the can and for releasing said finger to allow the can to be moved from beneath the seaming head after it is closed, said swinging finger having the end thereof which contacts with the can provided with spaced rounded gauging faces.

19. A filled can closing machine comprising a seaming head operating about a fixed vertical axis, a feeding means for feeding the filled cans beneath said head including a drum having a spiral thread thereon, a swinging finger located in the path of movement of the filled can beneath the head and cooperating with the spiral thread for positively centering the filled can beneath the seaming head, means for positively holding said finger in position for centering the can and for releasing said finger to allow the can to be moved from beneath the seaming head after it is closed, said swinging finger having the end thereof which contacts with the can provided with spaced rounded gauging faces, and means whereby said swinging finger can be adjusted.

20. A filled can closing machine comprising a seaming head operating about a fixed vertical axis, a feeding means for feeding the filled cans beneath said head including a drum having a spiral thread thereon, a swinging finger located in the path of movement of the filled can beneath the head, and cooperating with the spiral thread for positively centering the filled can beneath the seaming head, means for positively holding said finger in position for centering the can and for releasing said finger to allow the can to be moved from beneath the seaming head after it is closed, a rotating arm for engaging the closed can and moving the same from beneath the seaming head, said arm being timed to move said cans from beneath the head when released by said swinging finger.

21. A filled can closing machine comprising a seaming head operating about a fixed vertical axis, a feeding means for feeding the filled cans beneath said head including a drum having a spiral thread thereon, a swinging finger located in the path of movement of the filled can beneath the head, and cooperating with the spiral thread for positively centering the filled can beneath the seaming head, means for positively holding said finger in position for centering the can and for releasing said finger to allow the can to be moved from beneath the seaming head after it is closed, a rotating arm for moving the closed can from beneath the seaming head, a shaft supporting said arm, said shaft having means for positively holding said swinging finger in position for engaging and centering the can and for releasing said finger whereby it may be moved by said rotating arm from beneath the seaming head after it is closed.

22. A filled can closing machine comprising a seaming head operating about a vertical axis, means for feeding the filled cans beneath the seaming head including a rotating drum having a spiral thread thereon, an adjustable guide in rear of the center line of the seaming head, a swinging stop gauge located in front of the center line of the seaming head and positioned so that the thread on said drum will move a filled can along the gauge in rear of the head into contact with said arm and thus provide a three-point centering means for the filled can beneath the seaming head.

23. A filled can closing machine comprising a seaming head operating about a vertical axis, means for feeding the filled cans beneath the seaming head including a rotating drum having a spiral thread thereon, an adjustable guide in rear of the center line of the seaming head, a swinging stop gauge located in front of the center line of the seaming head and positioned so that the thread on said drum will move a filled can along the gauge in rear of the head into contact with said arm and thus provide a three-point centering means for the filled can beneath the seaming head, a vertically movable supporting pad for the filled can located at the end of the feed drum and in front of said guide rail on which said filled can is placed and centered whereby said can may be raised into cooperative relation with the seaming head.

24. A filled can closing machine comprising a seaming head operating about a vertical axis, means for feeding the filled cans beneath the seaming head including a rotating drum having a spiral thread thereon, an adjustable guide in rear of the center line of the seaming head, a swinging stop gauge located in front of the center line of the seaming head and positioned so that the thread on said drum will move a filled can along the gauge in rear of the head into contact with said arm and thus provide a three-point centering means for the filled can beneath the seaming head, a vertically movable supporting pad for the filled can located at the end of the feed drum and in front of said guide rail on which said filled can is placed and centered whereby said can may be raised into cooperative relation with the seaming head, a stationary tapered ring beneath the seaming head through which the upper portion of the filled can is passed in its vertical movement for rounding up the filled can and finally and positively centering the same beneath the seaming head.

25. A filled can closing machine comprising a seaming head operating about a vertical axis, means for feeding the filled can beneath the seaming head including a rotating drum having a spiral thread thereon, an adjustable guide in rear of the center line of the seaming head, a swinging stop gauge located in front of the center line of the seaming head and positioned so that the thread on said drum will move a filled can along the gauge in rear of the head into contact with said arm and thus provide a three-point centering means for the filled can beneath the seaming head, a vertically movable supporting pad for the filled can located at the end of the feed drum and in front of said guide rail on which said filled can is placed and centered whereby said can may be raised into cooperative relation with the seaming head, a stationary tapered ring beneath the seaming head through which the upper portion of the filled can is passed in its vertical movement for rounding up the filled can and finally and positively centering the same beneath the seaming head, a can end support above said tapered ring, and means controlled by the filled can as it is moved toward the seaming head for placing a can end on the can end seat.

26. A filled can closing machine comprising a seaming head operating about a vertical axis, means for feeding the filled cans beneath the seaming head including a rotating drum having a spiral thread thereon, an adjustable guide in rear of the center line of the seaming head, a swinging stop gauge located in front of the center line of the seaming head and positioned so that the thread on said drum will move a filled can along the gauge in rear of the head into contact with said arm and thus provide a three-point centering means for the filled can beneath the seaming head, and means for positively holding said swinging stop gauge for centering the can beneath the seaming head, and for releasing the same so that the closed can may be moved forward from beneath the seaming head.

27. A filled can closing machine comprising a seaming head operating about a vertical axis, means for feeding the filled cans beneath the seaming head including a rotating drum having a spiral thread thereon, an adjustable guide in rear of the center line of the seaming head, a swinging stop gauge located in front of the center line of the seaming head and positioned so that the thread on said drum will move a filled can along the gauge in rear of the head into contact with said arm and thus provide a three-point centering means for the filled can beneath the seaming head, a rotating arm adapted to engage the closed can when the supporting pad therefor is returned to its lowered position for moving the filled can from beneath the seaming head, and means movable with said rotating arm for positively holding said swinging stop gauge in position for centering the filled can during the initial upward movement of the supporting pad and for releasing said swinging stop gauge when the supporting pad has returned to its lowered position so that the closed can may be moved from beneath the closing head.

28. A filled can closing machine comprising a seaming head operating in a fixed position, a vertically movable supporting pad disposed beneath the seaming head and operating to raise the filled can into cooperative relation with the seaming head, feeding means for feeding a filled can on to the supporting pad, an adjustable guide rail in rear of the supporting pad, and a swinging stop gauge located in front and at one side of the supporting pad and in the path of movement of the filled can in the operation of the feeding mechanism thereon, whereby said filled can is centered on said supporting pad.

29. A filled can closing machine comprising a seaming head operating in a fixed position, a vertically movable supporting pad disposed beneath the seaming head and operating to raise the filled can into cooperative relation with the seaming head, feeding means for feeding a filled can on to the supporting pad, an adjustable guide rail in rear of the supporting pad, a swinging stop gauge located in front and at one side of the supporting pad and in the path of movement of the filled can in the operation of the feeding mechanism thereon, whereby said filled can is centered on said supporting pad, and positive means for holding said stop gauge in position for centering the can and for releasing said stop gauge to permit the closed can to be moved from beneath the seaming head.

30. A filled can closing machine comprising a seaming head operating in a fixed position, a vertically movable supporting pad disposed beneath the seaming head and operating to raise the filled can into cooperative relation with the seaming head, feeding means for feeding a filled can on to the supporting pad, an adjustable guide rail in rear of the supporting pad, a swinging stop gauge located in front and at one side of the supporting pad and in the path of movement of the filled can in the operation of the feeding mechanism thereon, whereby said filled can is centered on said supporting pad, and positive means for holding said stop gauge in position for centering the can and for releasing said stop gauge to permit the closed can to be moved from beneath the seaming head, said positive means including a rotating arm for positively moving the can when released from beneath the seaming head.

31. A filled can closing machine comprising a seaming head operating about a fixed vertical axis, a feeding mechanism including a feed drum having a spiral thread thereon, an adjustable guide rail in rear of said seaming head, a pivoted gauge finger located in front of said seaming head and having a gauging surface adapted to engage the closed can and cooperate with the thread on the drum and the adjustable guide rail for centering the can beneath the seaming head, and adjustable means for supporting said pivoted gauge finger whereby it may be moved toward and from the longitudinal axis of said feed drum.

32. A filled can closing machine comprising a seaming head operating about a fixed vertical axis, a feeding mechanism including a feed drum having a spiral thread thereon, an adjustable guide rail in rear of said seaming head, a pivoted gauge finger located in front of said seaming head and having a gauging surface adapted to engage the closed can and cooperate with the thread on the drum and the adjustable guide rail for centering the can beneath the seaming head, adjustable means for supporting said pivoted gauge finger whereby it may be moved toward and from the longitudinal axis of said feed drum, and a rotatable member having a concentric portion adapted to contact with said gauge finger and hold the same in position for centering the filled can, said rotating member having an eccentric portion which permits said finger to be released so as to swing and allow the closed can to be removed from beneath the seaming head.

33. A filled can closing machine comprising a seaming head operating about a fixed vertical axis, a feeding mechanism including a feed drum having a spiral thread thereon, an adjustable guide rail in rear of said seaming head, a pivoted gauge finger located in front of said seaming head, and having a gauging surface adapted to engage the closed can and cooperate with the thread on the drum and the adjustable guide rail for centering the can beneath the seaming head, adjustable means for supporting said pivoted gauge finger whereby it may be moved toward and from the longitudinal axis of said feed drum, a rotatable member having a concentric portion adapted to contact with said gauge finger and hold the same in position for centering the filled can, said rotating member having an eccentric portion which permits said finger to be released so as to swing and allow the closed can to be removed from beneath the seaming head, and a tension means cooperating with said swinging gauge finger for restraining the swinging movements of said gauge finger.

34. A filled can closing machine comprising a seaming head operating about a fixed vertical axis, a feeding mechanism including a feed drum having a spiral thread thereon, an adjustable guide rail in rear of said seaming head, a pivoted gauge finger located in front of said seaming head and having a gauging surface adapted to engage the closed can and cooperate with the thread on the drum and the adjustable guide rail for centering the can beneath the seaming head, adjustable means for supporting said pivoted gauge finger whereby it may be moved toward and from the longitudinal axis of said feed drum, a rotatable member having a concentric portion adapted to contact with said gauge finger and hold the same in position for centering the filled can, said rotating member having an eccentric portion which permits said finger to be released so as to swing and allow the closed can to be removed from beneath the seaming head, and an arm carried by said rotating member for engaging the closed can when released by said gauge finger for moving said can from beneath the seaming head.

35. A filled can closing machine comprising a seaming head operating about a fixed vertical axis, a feeding mechanism including a feed drum having a spiral thread thereon, an adjustable guide rail in rear of said seaming head, a pivoted gauge finger located in front of said seaming head and having a gauging surface adapted to engage the closed can and cooperate with the thread on the drum and the adjustable guide rail for centering the can beneath the seaming head, adjustable means for supporting said pivoted gauge finger whereby it may be moved toward and from the longitudinal axis of said feed drum, a rotatable member having a concentric portion adapted to contact with said gauge finger and hold the same in position for centering the filled can, said rotating member having an eccentric portion which permits said finger to be released so as to swing and allow the closed can to be removed from beneath the seaming head, an arm carried by said rotating member for engaging the closed can when released by said gauge finger for moving said can from beneath the seaming head, and a common means for rotating said feed drum, said rotating arm and controlling means for the gauge finger.

36. A filled can closing machine comprising a seaming head operating in a fixed position, a main frame on which said seaming head is mounted, a bracket attached to said main frame beneath said seaming head, a feed drum having a spiral thread formed thereon for moving the filled cans beneath the seaming head, said feed drum being carried by a shaft mounted in suitable bearings in said bracket, means whereby said bracket can be raised or lowered for adjusting the position thereof relative to the seaming head, means for operating said feed drum including a sectional shaft, one section of which is mounted in said veritcally adjustable bracket, and the other section of which is mounted on the frame of the machine and vertically shiftable thereon, and a universal connection between the sections of said shaft.

37. A filled can closing machine comprising a main frame, a seaming head mounted on said main frame and operating in a fixed position thereon, a vertically adjustable bracket located beneath said seaming head, a horizontal support carried by said bracket, a feed drum associated with said horizontal support for moving the filled can along said support beneath the seaming head, said feed drum being mounted on said bracket and vertically adjustable therewith, means for vertically adjusting said bracket, a vertical shaft located in the frame of the machine, means for rotating said shaft, a horizontal sectional shaft for operating said feed drum, one section of said shaft being mounted in bearings in said vertically adjustable bracket and movable up and down with said feed drum, a separate bracket vertically adjustably mounted on said frame, said separate bracket having bearings for the other section of said horizontal shaft, and a universal connection between the sections of said shaft.

38. A filled can closing machine comprising a main frame, a seaming head mounted on said main frame and operating in a fixed position thereon, a vertically adjustable bracket located beneath said seaming head, a horizontal support carried by said bracket, a feed drum associated with said horizontal support for moving the filled can along said support beneath the seaming head, said feed drum being mounted on said bracket and vertically adjustable therewith, means for vertically adjusting said bracket, a vertical shaft located in the frame of the machine, means for rotating said shaft, a horizontal sectional shaft for operating said feed drum, one section of said shaft being mounted in bearings in said vertically adjustable bracket and movable up and down with said feed drum, a separate bracket vertically adjustably mounted on said frame, said separate bracket having bearings for the other section of said horizontal shaft, a universal connection between the sections of said shaft, a supporting pad for the filled can for raising said filled can into cooperative relation with the seaming head, a box cam fixed to the lower end of the vertical shaft on the main frame, and a roller adjustably connected to the supporting pad and cooperating with said box cam for raising and lowering said pad.

39. A filled can closing machine comprising a main frame, a seaming head mounted on said main frame and operating in a fixed position thereon, a vertically adjustable bracket located beneath said seaming head, a horizontal support carried by said bracket, a feed drum associated with said horizontal support for moving the filled can along said support beneath the seaming head, said feed drum being mounted on said bracket and vertically adjustable therewith, means for vertically adjusting said bracket, a vertical shaft located in the frame of the machine, means for rotating said shaft, a horizontal sectional shaft for operating said feed drum, one section of said shaft being mounted in bearings in said vertically adjustable bracket and movable up and down with said feed drum, a separate bracket vertically adjustably mounted on said frame, said separate bracket having bearings for the other section of said horizontal shaft, a universal connection betwen the sections of said shaft, a supporting pad for the filled can for raising said filled can into cooperative relation with the seaming head, a box cam fixed to the lower end of the vertical shaft on the main frame, a roller adjustably connected to the supporting pad and cooperating with said box cam for raising and lowering said pad, a vertical shaft at one side of said supporting pad, means for operating said vertical shaft from the sections of the horizontal shaft carried by the vertically adjustable bracket, and an arm mounted on said last-named vertical shaft and rotating beneath the seaming head for moving the closed can from beneath the head.

40. A filled can closing machine comprising a main frame, a seaming head mounted on said main frame and operating in a fixed position thereon, a vertically adjustable bracket located beneath said seaming head, a horizontal support carried by said bracket, a feed drum associated with said horizontal support for moving the filled can along said support beneath the seaming head, said feed drum being mounted on said bracket and vertically adjustable therewith, means for vertically adjusting said bracket, a vertical shaft located in the frame of the machine, means for rotating said shaft, a horizontal sectional shaft for operating said feed drum, one section of said shaft being mounted in bearings in said vertically adjustable bracket and movable up and down with said feed drum, a separate bracket vertically adjustably mounted on said frame, said separate bracket having bearings for the other section of said horizontal shaft, a universal connection between the sections of said shaft, a supporting pad for the filled can for raising said filled can into cooperative relation with the seaming head, a box cam fixed to the lower end of the vertical shaft on the main frame, a roller adjustably connected to the supporting pad and cooperating with said box cam for raising and lowering said pad, a vertical shaft at one side of said supporting pad, means for operating said vertical shaft from the sections of the horizontal shaft carried by the vertically adjustable bracket, an arm mounted on said last-named vertical shaft and rotating beneath the seaming head for moving the closed can from beneath the head, a gauge finger adapted to aid in the centering of the filled can on the supporting pad, and means carried by said last-named vertical shaft for positively holding said gauge finger in position for centering the can and operating to release said gauge finger so that said rotating arm may move the can from beneath the seaming head.

41. A filled can closing machine comprising a main frame, a seaming head mounted on said main frame and operating in a fixed position thereon, a vertically adjustable bracket located beneath said seaming head, a horizontal support carried by said bracket, a feed drum associated with said horizontal support for moving the filled can along said support beneath the seaming head, said feed drum being mounted on said bracket and vertically adjustable therewith, means for vertically adjusting said bracket, a vertical shaft located in the frame of the machine, means for rotating said shaft, a horizontal sectional shaft for operating said feed drum, one section of said shaft being mounted in bearings in said vertically adjustable bracket and movable up and down with said feed drum, a separate bracket vertically adjustably mounted on said frame, said separate bracket having bearings for the other section of said horizontal shaft, a universal connection between the sections of said shaft, said section of the shaft carried by the separate bracket having a worm gear, a worm gear splined to the vertical shaft and meshing with said worm gear on the horizontal shaft, said separate bracket having formed arms projecting into the main frame and supporting the worm gear on the vertical shaft whereby the driving connection for the horizontal shaft from the vertical shaft is shifted when said separate bracket is raised or lowered.

42. A filled can closing machine comprising a main frame, a seaming head mounted on said main frame and operating in a fixed position thereon, a supporting pad for receiving and raising the filled can into cooperative relation with said seaming head, a vertical shaft in said main frame, a box cam carried at the lower end of said vertical shaft, a roller adjustably connected to said supporting pad and cooperating with said box cam whereby said supporting pad is raised and lowered by said box cam, said box cam being keyed to said vertical shaft, a cross shaft mounted in said main frame at the upper end of said vertical shaft, said cross shaft having a worm gear meshing with a worm gear on the upper end of the vertical shaft, a main operating shaft on the upper portion of said main frame having a geared connection with said cross shaft, said geared connection between the main shaft and the cross shaft, and the worm geared connection between the cross shaft and the vertical shaft being so proportioned as to rotate the vertical shaft at a much slower speed than the main shaft, said main shaft having a geared connection with said seaming head for rotating the same.

43. A filled can closing machine comprising a main supporting frame, a vertical shaft located therein, a main horizontal shaft at the upper end of the vertical shaft, means for rotating said vertical shaft from said main shaft, a seaming head carried by said main frame and rotating in a fixed position, means for rotating said seaming head from said main shaft, a fixed bracket beneath said seaming head having a tapered ring for rounding up the can body and centering the same relative to said rotating seaming head, said bracket having a can end seat at the upper end of said tapered ring, a vertically movably supporting pad beneath the seaming head for raising the filled can through the tapered ring into cooperative relation with the seaming head, a feed drum for moving the filled cans on to said supporting pad, a cover feed mounted on said stationary bracket carrying said tapered ring, said cover feed including a stack holder for can ends, releasing means for releasing the can ends, and a rotating arm for placing the can ends on the can end seat above said tapered ring, rotating marking devices for marking said can end on its way from the stack holder to the can end seat, means operated from said vertical shaft for rotating said feed drum, means operated from said vertical shaft for operating said can end feeding mechanism, means operated from said vertical shaft for raising and lowering said supporting pad, and means operated from said vertical shaft for operating said marking devices.

44. A filled can closing machine comprising a main frame, a seaming head mounted on said main frame and operating about a fixed vertical axis, a bracket located beneath said seaming head and having a fixed relation relative thereto, said bracket having a tapered ring for rounding up and centering the filled cans relative to the seaming head, a can end seat at the upper end of said tapered ring, a can end stack holder carried by said bracket, a rotating arm adapted to pass beneath said stack holder for engaging and carrying a can end released from the stack holder on to said can end seat, a sectional horizontal shaft carried by said bracket, means for connecting the outer section of said shaft to said arm for rotating the same, a can end releasing mechanism operatively connected to said outer sections of said shaft, an operating shaft within said main frame, and means for connecting said operating shaft to the inner section of said horizontal shaft, said outer section of said horizontal shaft having the end thereof spaced from the end of the inner section, a lug projecting from the end of one of said sections, a clutch dog carried by the other section, a spring for holding said clutch dog so that it will engage said lug and thus impart the rotations of the inner section of the horizontal shaft to the outer section thereof, a device located in the path of rotation of said clutch dog for normally holding said clutch dog out of engagement with said lug, and means controlled by a filled can passing beneath the seaming head for shifting said device so that the inner and outer sections of said horizontal shaft are clutched together for releasing and feeding a can end on to the can end seat for closing the can fed beneath the seaming head.

45. A filled can closing machine comprising a main frame structure, a seaming head mounted on said structure, a feeding mechanism mounted on said structure for placing the cans beneath the seaming head, a supporting base for the frame of the machine and the parts carried thereby, devices whereby said supporting frame may be raised and lowered relative to the supporting base for properly positioning the receiving end of the feeding mechanism relative to the mechanism for delivering the filled cans to the feeding mechanism of the closing machine, said devices including a plurality of supports threaded into said supporting base, means for turning said supports, and means for locking said supports in adjusted positions.

46. A filled can closing machine comprising a main frame structure, a seaming head mounted on said structure, a feeding mechanism mounted on said structure for placing the cans beneath the seaming head, a supporting base for the frame of the machine and the parts carried thereby, devices whereby said supporting frame may be raised and lowered relative to the supporting base for properly positioning the receiving end of the feeding mechanism relative to the mechanism for delivering the filled cans to the feeding mechanism of the closing machine, said devices including a plurality of supports threaded into said supporting base, a collar carried by each support whereby said supports can be turned, and a lock nut for each support for locking the same in adjusted positions.

47. A filled can closing machine comprising a main frame structure, a seaming head mounted on said structure, a feeding mechanism mounted on said structure for placing the cans beneath the seaming head, a supporting base for the frame of the machine and the parts carried thereby, devices whereby said supporting frame may be raised and lowered relative to the supporting base for properly positioning the receiving end of the feeding mechanism relative to the mechanism for delivering the filled cans to the feeding mechanism of the closing machine, a plurality of supports threaded into said base, each support having a shoulder on which the main frame of the machine rests, means whereby said supports may be turned to raise or lower the same, and a locking nut for locking each support in its adjusted position.

48. A filled can closing machine comprising a main frame structure, a seaming head mounted on said structure, a feeding mechanism mounted on said structure for placing the cans beneath the seaming head, a supporting base for the frame of the machine and the parts carried thereby, devices whereby said supporting frame may be raised and lowered relative to the supporting base for properly positioning the receiving end of the feeding mechanism relative to the mechanism for delivering the filled cans to the feeding mechanism of the closing machine, a plurality of supports threaded into said base, each support having a shoulder on which the main frame of the machine rests, means whereby said supports may be turned to raise or lower the same, a locking nut for locking each support in its adjusted position, and a series of open-sided washers adapted to be placed between the main frame of the machine and the supporting base for carrying the weight of the machine.

In testimony whereof, we affix our signatures.

HENRY A. FINK.
GEORGE FLOOK.